July 10, 1956     J. M. TOLCHER     2,753,778
ADJUSTABLE CAMERA SUPPORT
Filed June 1, 1953

John M. Tolcher
INVENTOR.

United States Patent Office 2,753,778
Patented July 10, 1956

2,753,778

ADJUSTABLE CAMERA SUPPORT

John M. Tolcher, Denver, Colo., assignor of one-half to Fred C. Daiss and one-half to Ava Daiss, both of Denver, Colo.

Application June 1, 1953, Serial No. 358,685

1 Claim. (Cl. 95—86)

This invention relates in general to improvements in camera supports, and more particularly to an adjustable camera support adapted to be carried by a photographer for rigidly supporting a camera.

In the taking of good pictures, one of the primary necessities is a proper support for the camera being utilized. Unless a camera is properly supported, the camera cannot be directed in the necessary manner to include in the picture being taken all of the desired features of a particular scene. While there have been devised numerous devices for supporting a camera, such as tripods and the like, none proved satisfactory for the convenient supporting cameras in readily adjustable positions.

It is therefore the primary object of the invention to provide an improved camera support which may be conveniently carried by a photographer and firmly held against a portion of his or her body so as to provide a suitable support for an associated camera.

Another object of this invention is to provide an improved camera support which is highly adjustable so as to accommodate various types of cameras and at the same time being so designed whereby it may be utilized by persons of different sizes.

Another object of this invention is to provide an improved camera support which is readily adjustable and at the same time of a relatively compact design and formed of readily obtainable materials so as to be economically feasible.

A further object of this invention is to provide an improved camera support which includes a body engaging member, the body engaging member being adjustable with respect to the remainder to the camera support and being positionable for engaging either a shoulder of a photographer or a portion of a photographer's waist so as to provide a stable support for a camera mounted thereon.

A still further object of this invention is to provide an improved camera support which includes a forwardly disposed handle, the handle having carried thereby a cable release for a camera mounted on a cable support, the cable release including an actuating button which is positioned with respect to the handle so as to be conveniently depressed by finger of the hand gripping the handle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
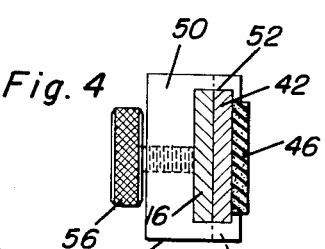
Figure 3:
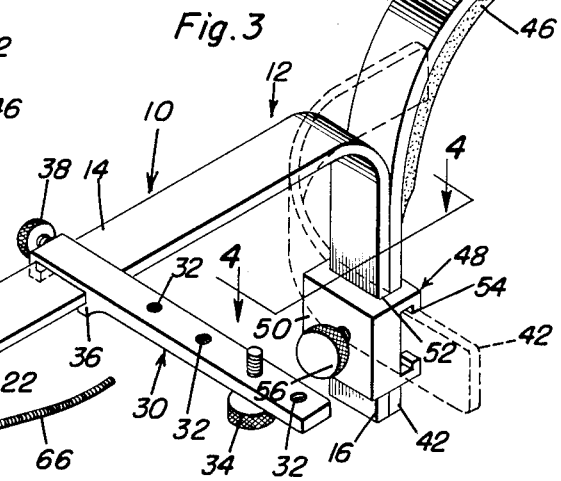

Figure 3 is an enlarged perspective view of the camera support and shows the general construction of the same, an alternate position of the body engaging member of the camera support being shown in dotted lines; and Figure 4 is a sectional view taken substantially upon the plane indicated by the section line 4—4 of Figure 3 and shows the relationship of the body engaging member with respect to the supporting member to which it is adjustably clamped, also being shown is the general construction of the clamp.

Referring now to the drawings in detail, it will be seen that there is illustrated in Figures 3 and 4, the adjustable camera support which is the subject of this invention, the adjustable support being referred to in general by the reference numeral 10. The adjustable camera support 10 includes a generally L-shaped supporting member which is referred to in general by the reference numeral 12. The supporting member 12 includes an elongated horizontal leg 14 which has integral therewith at its rear end a vertically extending leg 16, the leg 16 being shorter than the leg 14.

Adjustably carried by the forward portion of the horizontal leg 14 is a handle 18. The handle 18 has at the forward edge thereof a finger engaging portion 20. The upper portion of the handle 18 is enlarged as at 22 and is provided with a rectangular, longitudinally extending slot 24 through which passes a free end of the leg 14. The extreme upper end of the handle 18 is provided with a recess 26 which communicates with the recess 24. In order that the handle 18 may be adjustably retained on the leg 14, the enlarged upper portion of the handle 18 is provided with a locking screw 28 which engages a side edge of the leg 14 to prevent relative movement between the handle 18 and the leg 14.

Carried by the leg 14 intermediate the handle 18 and its intersection with the leg 16, is camera supporting member which is referred to in general by the reference numeral 30. The camera supporting member is in the form of an elongated bar which extends transversely of the leg 14 and which has selectively threadedly engaged in one of a plurality of spaced internally threaded bores 32, a fastener 34. It will be understood that the fastener 34 is of a size to receive within a fitting (not shown) carried by a camera. If desired, the internally threaded bores may be replaced by an elongated slot in which the fastener 34 is adjustably received.

It will be noted that the end of the bar forming the camera support 30 which is adjacent the leg 14, is provided at its underside with internally C-shaped clamp 36. The clamp 36 is formed integral with the bar forming the camera support 30 and is so positioned with respect to the remainder of the bar that when the leg 14 is received therein, the bar extends transversely of the leg. The camera support 30 is adjustably positioned on the leg 14 by a lock screw 28 threadedly engaged in the clamp 36 and selectively engageable with a side edge of the leg 14.

The camera support 10 also includes a body engaging member which is referred to in general by the reference numeral 40. The body engaging member 40 is generally L-shaped and includes a first leg 42 and a second leg 44. The first leg 42 is intended to be clamped to the leg 16 of the supporting member 12 and the leg 44 has secured to the intersurface thereof a resilient pad 46. Adjustably securing the leg 42 to the leg 46 is a clamp which is referred to in general by the reference numeral 48.

The clamp 48 is in the form of a generally rectangular block 50 which includes a vertical recess 52 of a cross-section to receive both the legs 16 and 42.

The block 50 also includes a transversely extending recess 54 which is rectangular in cross-section and of a size to receive only the leg 42. The recess 54 is in alignment with the outer half of the recess 52 which normally receives the leg 42. In order that the legs 16 and 42 may be adjustably positioned relative to each other, the block 50 is provided with a locking screw 56 which is threadedly engaged therein and which enters the recesses 52 and 54 at right angles to the longitudinal axes thereof, the locking screw 56 engaging the associated portion of the leg 16 and clamping the legs 16 and 42 in their respective recesses.

Figure 2:
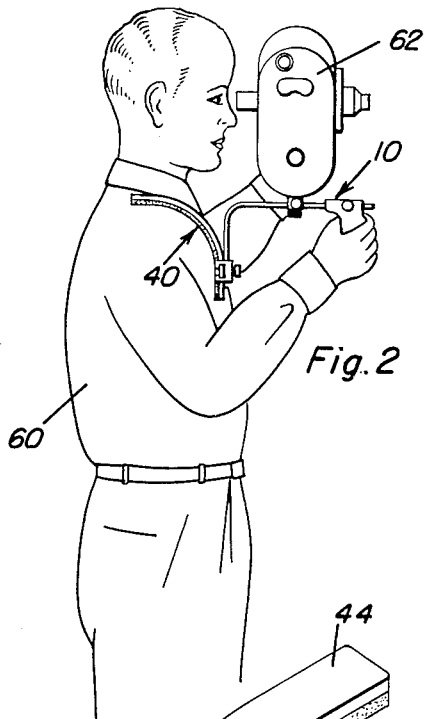
Figure 2 is a fragmentary side elevational view similar to Figure 1 and showing the photographer of Figure 1 utilizing the camera support for the supporting of a movie camera, the camera support being in engagement with the shoulder portion of the photographer.

When it is desired to utilize the adjustable camera support 10 with the body engaging member 40 having the leg 44 thereof engaging a shoulder portion of one's body, the body engaging member 40 is disposed in longitudinal alignment with the supporting member 12. To so position the body engaging member 40, the leg 42 is in a vertical position in face-to-face engagement with the leg 16. It will be understood that the legs 16 and 42 are both received in the recess 52 and that the leg 42 is clamped within the recess 52 in vertically adjusted position with respect to the leg 16 by the clamp 56. When the body engaging member 40 is so positioned with respect to the supporting member 12, the adjustable camera support 10 may be utilized by a photographer, such as the photographer 60 of Figure 2, with the body engaging member 40 engaging the shoulder portion thereof. The camera support 10 is shown in use by the photographer 60 with a movie camera 62 mounted thereon.

Figure 1:
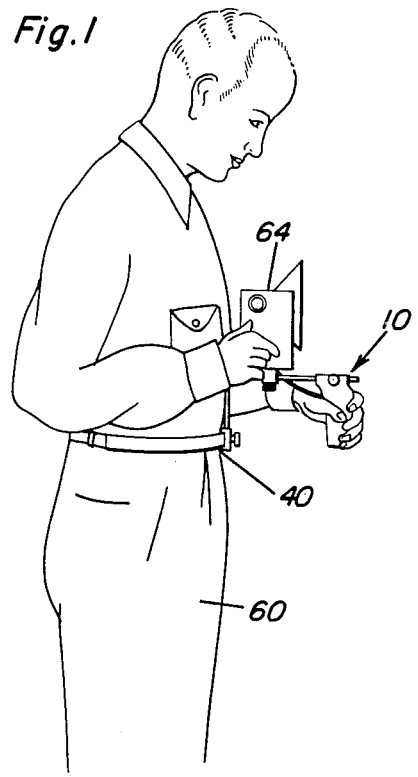
Figure 1 is a fragmentary elevational view of a photographer utilizing the camera support to properly support a roll film camera in a picture taking position, the camera support engaging the weight of the photographer.

Referring now to Figure 1 in particular, it will be seen that the photographer 60 is utilizing the adjustable camera support 10 with a camera 64 intended for use with roll of film or the like. The adjustable camera support 10 is disposed in front of the photographer and the body engaging member 40 is disposed in a horizontal position and engaging the waist of the photographer 60.

When it is desired to utilize the body engaging member 40 in a horizontal position, the leg 42 is removed from the recess 52 and passed through the recess 54 in the position best illustrated in Figure 3. Then by vertically adjusting the clamp 48 on the leg 16 and transversely adjusting the leg 42 with respect to the clamp 48, the body engaging member 40 may be properly positioned for engagement with the waist of a photographer.

In order that a camera having a snap shutter mechanism may be conveniently operated when mounted on the adjustable camera support 10, the handle 18 has associated therewith a cable release 66. The cable release 66 passes through a longitudinally extending bore 68 in the handle 18 and is clamped therein by a setscrew 70. An actuating button 72 of the cable release 66 is properly positioned for engagement by finger of the hand gripping the handle 18 for convenient actuation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

An adjustable camera support comprising an L-shaped supporting member, a handle carried at one end of said supporting member, a body engaging member carried at the opposite end of said supporting member, a camera support carried by said supporting member intermediate its ends, said body engaging member being L-shaped and adjustably secured to said supporting member by a clamp member, said clamp member being provided with a pair of slots disposed at right angles for selectively receiving a leg of said body engaging member, said leg being slidable through said clamp for adjusted positioning.

References Cited in the file of this patent

UNITED STATES PATENTS

| | | |
|---|---|---|
| 1,179,063 | Aldrete | Apr. 11, 1916 |
| 2,370,611 | Du Mais | Feb. 27, 1945 |
| 2,483,711 | Roos | Oct. 4, 1949 |